US012634757B2

(12) United States Patent
Kasi et al.

(10) Patent No.: US 12,634,757 B2
(45) Date of Patent: May 19, 2026

(54) SYSTEMS AND METHODS FOR DYNAMIC LOAD MANAGEMENT IN TELECOMMUNICATIONS NETWORKS

(71) Applicant: T-MOBILE INNOVATIONS LLC, Overland Park, KS (US)

(72) Inventors: Narayanan Govindan Kasi, Olathe, KS (US); Saravana Kumar Velusamy, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 63 days.

(21) Appl. No.: 18/883,922

(22) Filed: Sep. 12, 2024

(65) Prior Publication Data

US 2026/0075465 A1 Mar. 12, 2026

(51) Int. Cl.
*H04W 28/08* (2023.01)
*H04W 28/02* (2009.01)

(52) U.S. Cl.
CPC ....... *H04W 28/08* (2013.01); *H04W 28/0278* (2013.01); *H04W 28/0908* (2020.05); *H04W 28/0958* (2020.05)

(58) Field of Classification Search
CPC ............. H04W 28/08; H04W 28/0278; H04W 28/0908; H04W 28/0958
See application file for complete search history.

(56) References Cited

U.S. PATENT DOCUMENTS

| | | | | |
|---|---|---|---|---|
| 10,506,469 | B1 * | 12/2019 | Gottardi | H04L 67/1014 |
| 2020/0177682 | A1 * | 6/2020 | Brooks | H04L 67/141 |
| 2022/0272579 | A1 * | 8/2022 | Narang | H04L 41/069 |
| 2022/0345519 | A1 * | 10/2022 | Patel | H04L 67/101 |
| 2023/0066148 | A1 * | 3/2023 | Alasti | H04L 47/127 |
| 2023/0147177 | A1 * | 5/2023 | Alasti | H04W 40/246 370/329 |
| 2023/0239227 | A1 * | 7/2023 | Espinosa Santos | H04L 67/51 709/224 |
| 2024/0196275 | A1 * | 6/2024 | Alasti | H04W 28/0942 |
| 2024/0370288 | A1 * | 11/2024 | Scherrer | G06F 9/45558 |
| 2025/0254565 | A1 * | 8/2025 | Bashir | H04L 47/125 |

FOREIGN PATENT DOCUMENTS

| | | | | | |
|---|---|---|---|---|---|
| CN | 116321107 | A | * | 6/2023 | H04W 8/18 |
| CN | 114124686 | B | * | 2/2024 | H04L 1/08 |
| CN | 118945903 | A | * | 11/2024 | H04W 76/34 |
| WO | WO-2024260026 | A1 | * | 12/2024 | H04W 36/0055 |

\* cited by examiner

*Primary Examiner* — Oanh Duong
(74) *Attorney, Agent, or Firm* — SHOOK, HARDY & BACON L.L.P.; Elena K. McFarland

(57) ABSTRACT

Systems and methods are provided for managing load distribution in a telecommunications network. Specifically, a session management function (SMF) dynamically reallocates or redirects network sessions when the required load metric information is not received from a user plane function (UPF). The SMF utilizes control information and historical performance data to infer the operational status of the UPF and make real-time decisions to prevent network congestion and maintain service quality. This approach allows the SMF to continue managing network sessions efficiently, even in the absence of updated load metrics, ensuring the network remains stable and responsive under varying condition.

20 Claims, 4 Drawing Sheets

100

MEMORY

104

PROCESSOR(S)

106

PRESENTATION
COMPONENT(S)

108

RADIO

116

I/O PORT(S)

110

I/O COMPONENT(S)

112

POWER SUPPLY

114

102

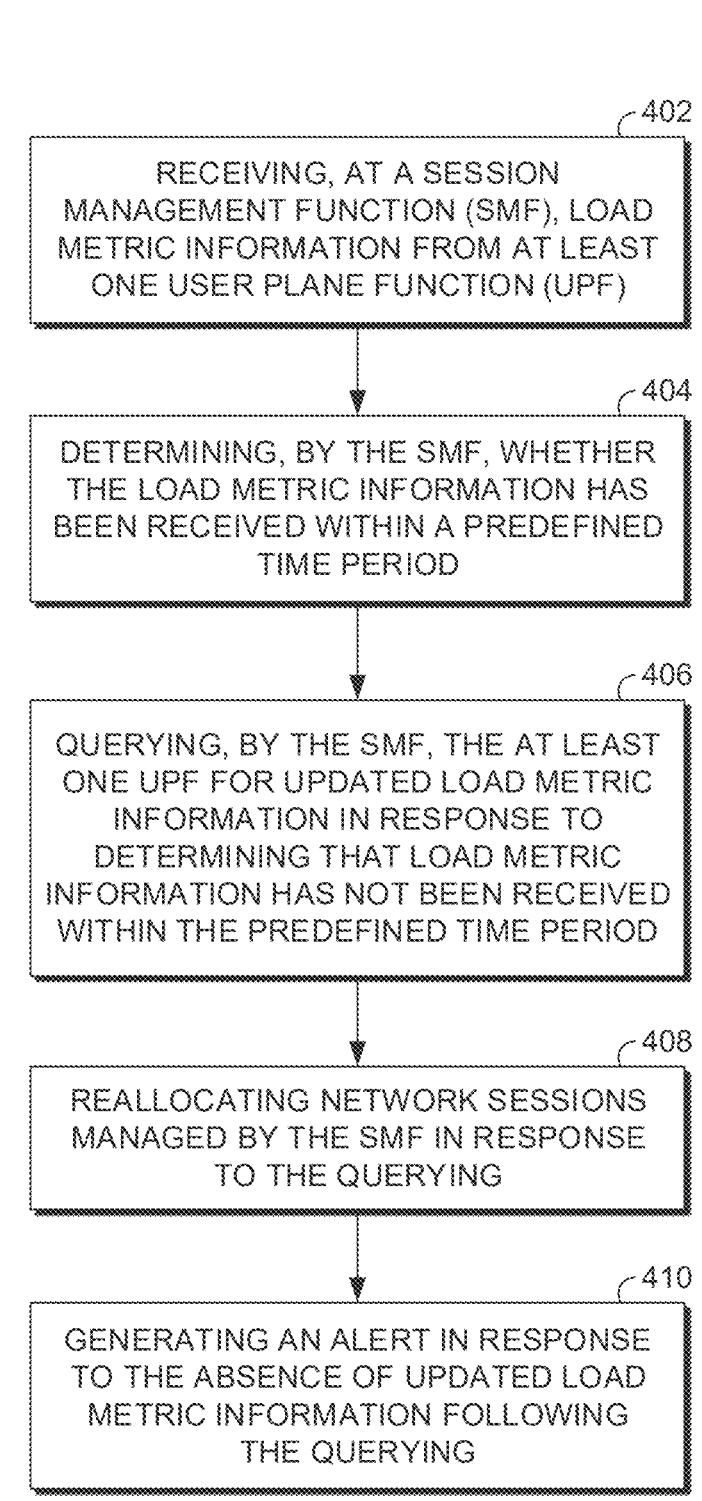

400

402

RECEIVING, AT A SESSION MANAGEMENT FUNCTION (SMF), LOAD METRIC INFORMATION FROM AT LEAST ONE USER PLANE FUNCTION (UPF)

404

DETERMINING, BY THE SMF, WHETHER THE LOAD METRIC INFORMATION HAS BEEN RECEIVED WITHIN A PREDEFINED TIME PERIOD

406

QUERYING, BY THE SMF, THE AT LEAST ONE UPF FOR UPDATED LOAD METRIC INFORMATION IN RESPONSE TO DETERMINING THAT LOAD METRIC INFORMATION HAS NOT BEEN RECEIVED WITHIN THE PREDEFINED TIME PERIOD

408

REALLOCATING NETWORK SESSIONS MANAGED BY THE SMF IN RESPONSE TO THE QUERYING

410

GENERATING AN ALERT IN RESPONSE TO THE ABSENCE OF UPDATED LOAD METRIC INFORMATION FOLLOWING THE QUERYING

FIG. 4.

SYSTEMS AND METHODS FOR DYNAMIC LOAD MANAGEMENT IN TELECOMMUNICATIONS NETWORKS

SUMMARY

The present disclosure is directed, in part, to systems and methods for managing load distribution and session allocation in telecommunication networks, substantially as shown and/or described in connection with at least one of the figures. The disclosure provides detailed descriptions of the interactions between network components, such as a session management function (SMF) and user plane functions (UPFs), and how these interactions are utilized to ensure optimal performance, stability, and continuity of service within a network, particularly in scenarios where communication failures or load imbalances can occur.

According to various aspects of the technology, the disclosure addresses the problem of maintaining efficient network operations and service continuity in telecommunication networks, particularly when load metric information is not timely received from UPFs. This problem is significant because a failure to obtain accurate and timely load metrics can lead to improper session allocations, overloading of certain network components, and ultimately service disruptions. The solution proposed in this disclosure involves a systematic method where the SMF actively monitors and queries UPFs for load metrics, reallocates sessions based on available data, and generates alerts when issues arise. By achieving this proactive and responsive management approach, the problem of network instability and service degradation due to load management issues can be mitigated.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

FIG. 4 illustrates a flow diagram of an exemplary method for managing load distribution and session allocation in telecommunication networks in which implementations of the present disclosure may be employed.

DETAILED DESCRIPTION

Figure 1:
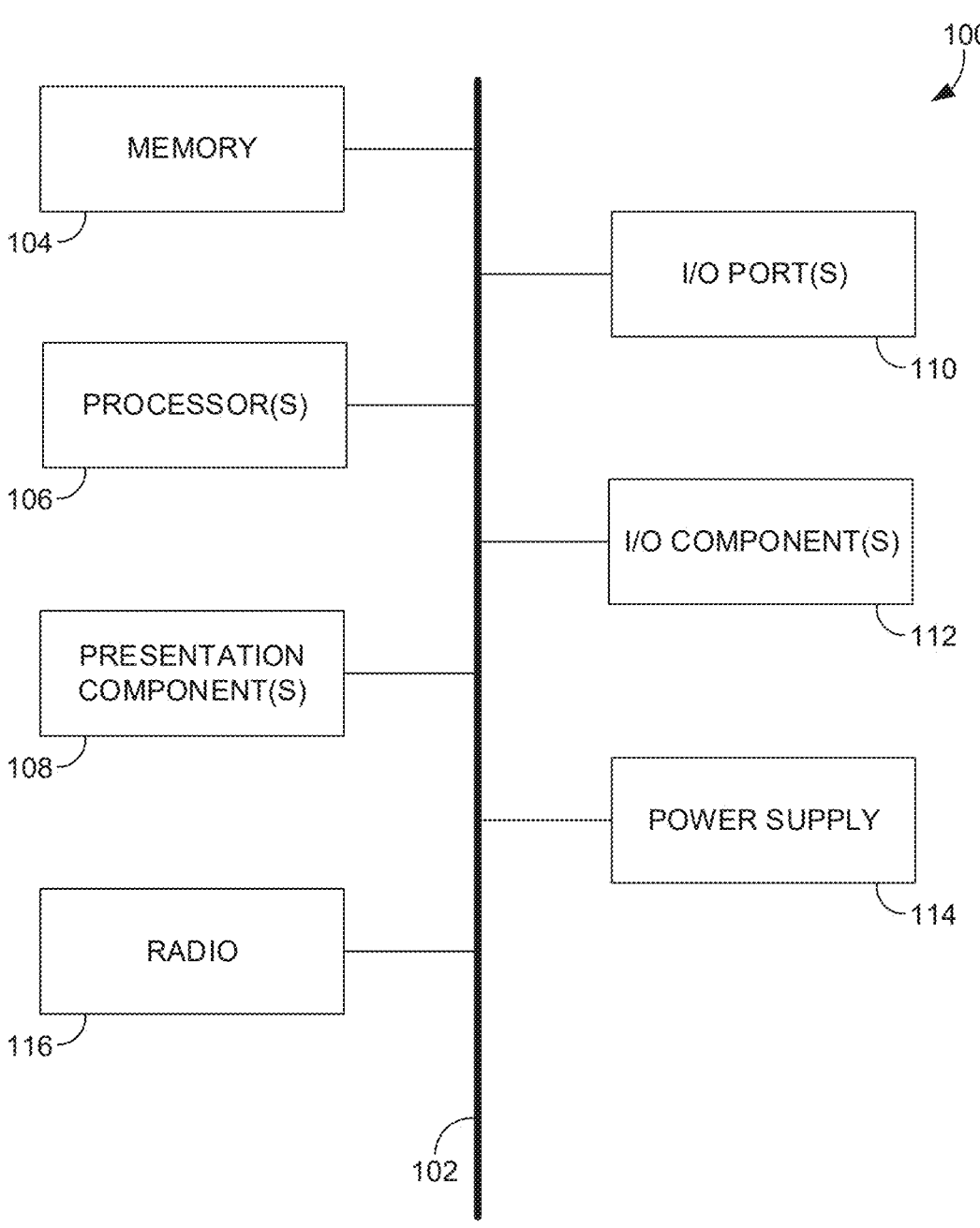
FIG. 1 illustrates an exemplary computing device for use with the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various technical terms, acronyms, and shorthand notations are employed to describe, refer to, and/or aid the understanding of certain concepts pertaining to the present disclosure. Unless otherwise noted, said terms should be understood in the manner they would be used by one with ordinary skill in the telecommunication arts. An illustrative resource that defines these terms can be found in Newton's Telecom Dictionary, (e.g., 32d Edition, 2022). As used herein, the term "base station" refers to a centralized component or system of components that is configured to wirelessly communicate (receive and/or transmit signals) with a plurality of stations (i.e., wireless communication devices, also referred to herein as user equipment (UE(s))) in a particular geographic area. As used herein, the term "network access technology (NAT)" is synonymous with wireless communication protocol and is an umbrella term used to refer to the particular technological standard/protocol that governs the communication between a UE and a base station; examples of network access technologies include 3G, 4G, 5G, 6G, 802.11x, and the like.

Embodiments of the technology described herein may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media that may cause one or more computer processing components to perform particular operations or functions.

Computer-readable media include both volatile and non-volatile media, removable and non-removable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

In modern telecommunication networks, the efficient management of network sessions and load distribution is paramount, especially as networks become increasingly complex and user demands for uninterrupted service continue to grow. Ensuring that session management functions, such as the SMF and UPF, operate seamlessly even during communication failures is crucial for maintaining high-quality service and network reliability. This is particularly important when the SMF fails to receive timely load metric information from the UPF, as it could lead to potential service disruptions and network inefficiencies.

Traditionally, network session management relies on the continuous exchange of load metric information between the SMF and the UPF. The SMF requests and receives load metrics from the UPF to allocate network resources efficiently, ensuring that no single UPF is overloaded. However, this conventional method can encounter significant challenges when the UPF fails to provide the necessary information due to communication failures or network issues. Such failures can lead to improper session allocations, overburdening specific UPFs, and ultimately degrading the quality of service provided to users.

Unlike conventional approaches, the present disclosure introduces a method for managing network sessions during communication failures between the SMF and the UPF, specifically designed to ensure network stability and service continuity. The method involves the SMF continuously monitoring the receipt of load metric information from the UPF and actively querying the UPF when expected updates are not received within a predefined time period. If the UPF fails to respond to the query, the SMF reallocates network sessions based on the last known metrics or default policies, and generates alerts to notify network operators of the issue. This approach, including the generation of alerts and the reallocation of sessions, ensures that the network continues to function efficiently despite communication failures, significantly improving service reliability and preventing potential network congestion.

Accordingly, a first aspect of the present disclosure provides a system for optimizing session management and load distribution in a telecommunication network. The system comprises one or more computer processing components configured to perform operations. The operations comprise first requesting, at an SMF, load metric information from a UPF to assess the current load conditions within the network. The operations next comprise determining, at the SMF, whether the load metric information has been received within a predefined time period. The operations further comprise, based on the absence of load metric information, communicating a query to the UPF to request updated metrics. The operations additionally comprise the SMF reallocating network sessions based on the last known metrics or default policies if the UPF fails to respond. The operations finally comprise generating an alert at the SMF to notify network operators of the potential issue with the UPF, ensuring that corrective measures can be taken to maintain network stability and performance.

A second aspect of the present disclosure provides a method for ensuring continuous and efficient session management during communication failures between the SMF and UPF in a telecommunication network. The method comprises first requesting load metric information from a UPF by the SMF to determine the current load on the network. The method next comprises determining, at the SMF, whether the load metric information has been received within a predefined time period. The method further comprises the SMF sending a query to the UPF for updated load metrics if the information is not received within the set timeframe. The method additionally comprises reallocating network sessions based on the last known metrics or default policies if the UPF fails to provide the requested information. The method finally comprises generating an alert by the SMF to notify network operators of the issue, enabling them to take necessary actions to address the problem and maintain the network's efficiency and reliability.

Another aspect of the present disclosure is directed to a non-transitory computer-readable medium having instructions stored thereon that, when executed by one or more computer processing components, cause the one or more computer processing components to perform a method for optimizing session management and load distribution in a telecommunication network. The method comprises first requesting, at an SMF, load metric information from a UPF to evaluate the network's current conditions. The method next comprises determining whether the load metric information has been received within a predefined time period. The method further comprises the SMF sending a query to the UPF for updated load metrics if the requested information is not received within the predefined time. The method additionally comprises reallocating network sessions based on the last known metrics or default policies in the event of a failure to receive updated information from the UPF. The method finally comprises generating an alert at the SMF to inform network operators of the potential issue, allowing for prompt action to be taken to resolve the problem and maintain optimal network performance.

Referring to the drawings in general, and initially to FIG. 1, an exemplary computing environment 100 suitable for practicing embodiments of the present technology is provided. Computing environment 100 is just one example, and is not intended to suggest any limitation as to the scope of use or functionality of the embodiments discussed herein. Furthermore, the computing environment 100 should not be interpreted as having any dependency or requirement relating to any one or a combination of components illustrated. It should be noted that although some components in FIG. 1 are shown in the singular, they may be plural. For example, the computing environment 100 might include multiple processors and/or multiple radios. As shown in FIG. 1, computing environment 100 includes a bus 102 that directly or indirectly couples various components together, including memory 104, processor(s) 106, presentation component(s) 108 (if applicable), radio(s) 116, input/output (I/O) port(s) 110, input/output (I/O) component(s) 112, and power supply 114. More or fewer components are possible and contemplated, including in consolidated or distributed form.

Memory 104 may take the form of memory components described herein. Thus, further elaboration will not be provided here, but it should be noted that memory 104 may include any type of tangible medium that is capable of storing information, such as a database. A database may be any collection of records, data, and/or information. In one embodiment, memory 104 may include a set of embodied computer-executable instructions that, when executed, facilitate various functions or elements disclosed herein. These embodied instructions will variously be referred to as "instructions" or an "application" for short. Processor 106 may actually be multiple processors that receive instructions and process them accordingly. Presentation component 108 may include a display, a speaker, and/or other components that may present information (e.g., a display, a screen, a lamp (LED), a graphical user interface (GUI), and/or even lighted keyboards) through visual, auditory, and/or other tactile cues.

Radio 116 may facilitate communication with a network, and may additionally or alternatively facilitate other types of wireless communications, such as Wi-Fi, WiMAX, LTE, and/or other VOIP communications. In various embodiments, the radio 116 may be configured to support multiple technologies, and/or multiple radios may be configured and utilized to support multiple technologies. The input/output (I/O) ports 110 may take a variety of forms. Exemplary I/O ports may include a USB jack, a stereo jack, an infrared port, a firewire port, other proprietary communications ports, and the like. Input/output (I/O) components 112 may comprise keyboards, microphones, speakers, touchscreens, and/or any other item usable to directly or indirectly input data into the computing environment 100. Power supply 114 may include batteries, fuel cells, and/or any other component that may act as a power source to supply power to the computing environment 100 or to other network components, including through one or more electrical connections or couplings. Power supply 114 may be configured to selectively supply power to different components independently and/or concurrently.

Figure 2:
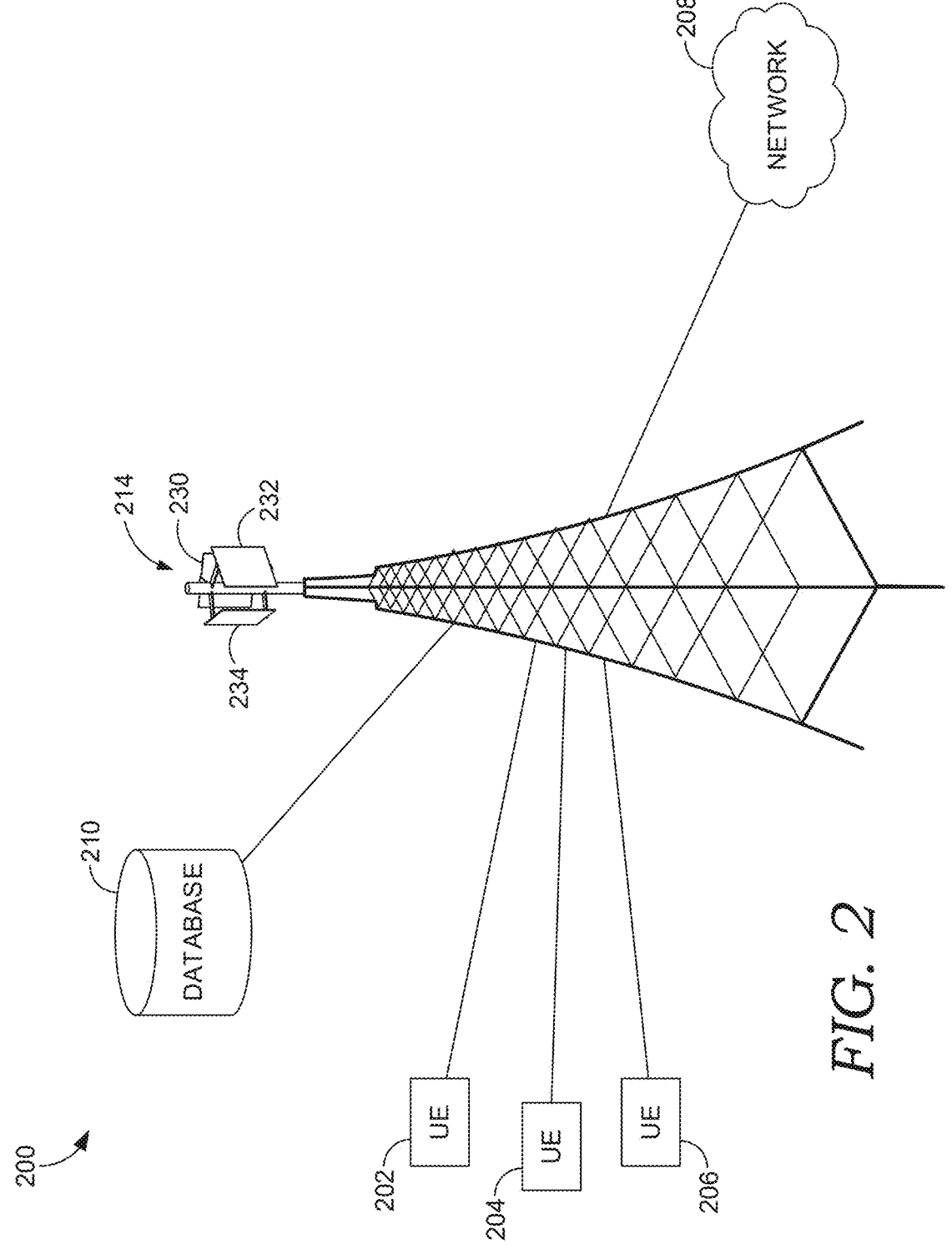
FIG. 2 illustrates a diagram of an exemplary network environment in which implementations of the present disclosure may be employed.

FIG. 2 provides an exemplary network environment in which implementations of the present disclosure may be employed. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

Network environment 200 includes one or more user devices (e.g., user devices 202, 204, and 206), cell site 214, network 208, database 210, and dynamic mitigation engine 212. In network environment 200, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, an access point, and any combination of these delineated devices, or any other device that communicates via wireless communications with a cell site 214 in order to interact with a public or private network.

In some aspects, the user devices 202, 204, and 206 correspond to computing device 100 in FIG. 1. Thus, a user device may include, for example, a display(s), a power source(s) (e.g., a battery), a data store(s), a speaker(s), memory, a buffer(s), a radio(s) and the like. In some implementations, the user devices 202, 204, and 206 comprises a wireless or mobile device with which a wireless telecommunication network(s) may be utilized for communication (e.g., voice and/or data communication). In this regard, the user device may be any mobile computing device that communicates by way of a wireless network, for example, a 3G, 4G, 5G, LTE, 6G, CDMA, or any other type of network.

Additionally, device 206 can be any device characterized by high data throughput needs, such as advanced gaming consoles that require rapid data exchange for real-time multiplayer experiences, or professional-grade video conferencing systems used in businesses for high-quality virtual meetings. This category also includes emerging Internet of Things (IoT) devices, like intelligent security cameras and smart home appliances, which constantly transmit and receive data for automation and monitoring purposes. Furthermore, high-performance tablets and laptops, also fall under this category, as they require high-speed internet for cloud computing and large file transfers.

In some cases, the user devices 202, 204, and 206 in network environment 200 may optionally utilize network 208 to communicate with other computing devices (e.g., a mobile device(s), a server(s), a personal computer(s), etc.) through cell site 214. The network 208 may be a telecommunications network(s), or a portion thereof. A telecommunications network might include an array of devices or components (e.g., one or more base stations), some of which are not shown. Those devices or components may form network environments similar to what is shown in FIG. 2, and may also perform methods in accordance with the present disclosure. Components such as terminals, links, and nodes (as well as other components) may provide connectivity in various implementations. Network 208 may include multiple networks, as well as being a network of networks, but is shown in more simple form so as to not obscure other aspects of the present disclosure.

Network 208 may be part of a telecommunication network that connects subscribers to their service provider. In aspects, the service provider may be a telecommunications service provider, an internet service provider, or any other similar service provider that provides at least one of voice telecommunications and data services to any or all of the user devices 202, 204, and 206. For example, network 208 may be associated with a telecommunications provider that provides services (e.g., LTE, 4G, 5G, 6G) to the user devices 202, 204, and 206. Additionally or alternatively, network 208 may provide voice, SMS, and/or data services to user devices or corresponding users that are registered or subscribed to utilize the services provided by a telecommunications provider. Network 208 may comprise any communication network providing voice, SMS, and/or data service(s), using any one or more communication protocols, such as a 1× circuit voice, a 3G network (e.g., CDMA, CDMA2000, WCDMA, GSM, UMTS), a 4G network (WiMAX, LTE, HSDPA), a 5G network, or a 6G network. The network 208 may also be, in whole or in part, or have characteristics of, a self-optimizing network.

In some implementations, cell site 214 is configured to communicate with the user devices 202, 204, and 206 that are located within the geographical area defined by a transmission range and/or receiving range of the radio antennas of cell site 214. The geographical area may be referred to as the "coverage area" of the cell site or simply the "cell," as used interchangeably hereinafter. Cell site 214 may include one or more base stations, base transmitter stations, radios, antennas, antenna arrays, power amplifiers, transmitters/receivers, digital signal processors, control electronics, GPS equipment, and the like. In particular, cell site 214 may be configured to wirelessly communicate with devices within a defined and limited coverage area. In an exemplary aspect, the cell site 214 comprises a base station that serves at least one sector of the cell associated with the cell site 214, and at least one transmit antenna for propagating a signal from the base station to one or more of the user devices 202, 204, and 206. In other aspects, the cell site 214 may comprise multiple base stations and/or multiple transmit antennas for each of the one or more base stations, any one or more of which may serve at least a portion of the cell. For example, the cell site may comprise a first antenna array 230, a second antenna array 232, and a third antenna array 234, wherein each of the antenna arrays serves a distinct sector (i.e., portion) of the coverage area of the cell 214. In some aspects, the cell site 214 may comprise one or more macro cells (providing wireless coverage for users within a large geographic area) or it may be a small cell (providing wireless coverage for users within a small geographic area).

Figure 3:
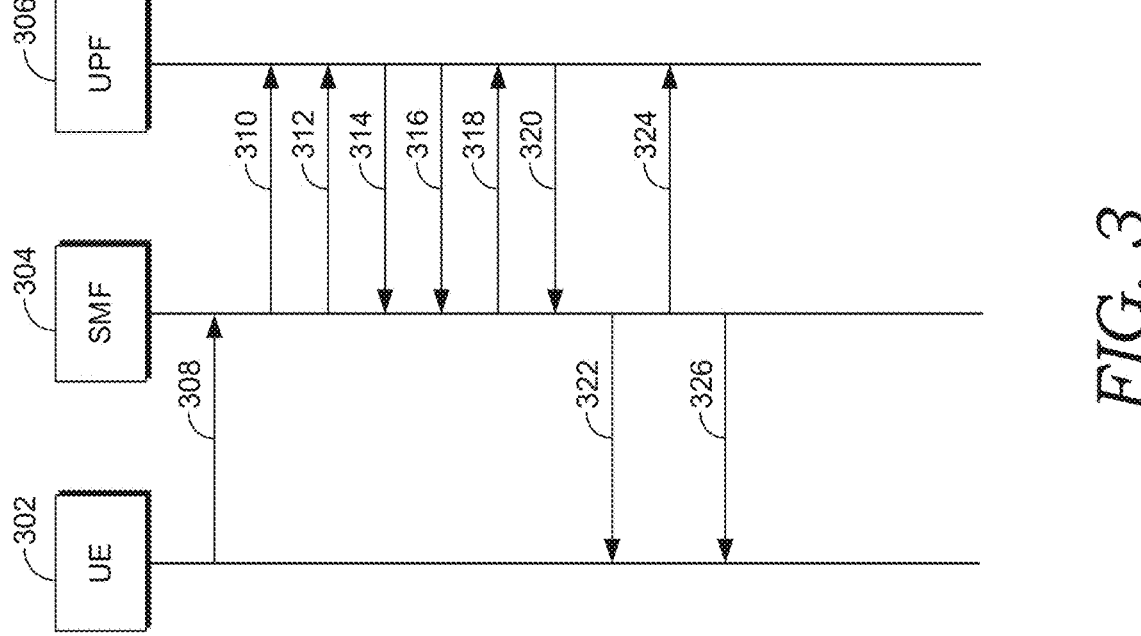
FIG. 3 illustrates a call flow diagram of an exemplary method for managing load distribution and session allocation in telecommunication networks in which implementations of the present disclosure may be employed.
Figure 3:

Turning now to FIG. 3, a call flow diagram is presented, detailing the specific interactions between the SMF 304 and UPFs 306 for managing load distribution and session allocation within a telecommunications network. The process begins when a UE 302 initiates a session request, prompting a series of systematic operations by the SMF 304 and UPF 306 to allocate network resources efficiently, ensure optimal load distribution, and maintain the overall stability of the network. Each step in the process is crucial for minimizing the risk of network overload and ensuring uninterrupted service delivery.

At step 308, the UE 302 sends a session request to the SMF 304. This session request is a protocol message, typically containing details about the requested service, such as the type of communication (voice call, data session, multimedia streaming), Quality of Service (QoS) requirements, and any associated session identifiers. Upon receipt of this request, the SMF 304 processes the information to prepare for resource allocation. The SMF 304 initiates this process by identifying the appropriate UPF 306 based on the network's current topology and the requested service parameters. This selection is influenced by factors such as geographic location, the current load on available UPFs, and the specific capabilities of the UPFs.

This initial session request triggers the SMF 304 to establish a new session by interacting with the UPF 306. The SMF 304 evaluates the load metrics of the selected UPF 306 to determine if it has the necessary capacity to handle the new session. This evaluation involves querying internal data structures or real-time load monitoring systems that track the current CPU utilization, memory usage, active session count, and other performance metrics of the UPF 306. The SMF 304 uses this data to ensure that the UPF 306 can accommodate the new session without risking overload, thus maintaining the network's performance and stability.

In step 310, following the initial session request, the SMF 304 transmits a session allocation command to the selected UPF 306. This command is a control message that includes specific parameters for the session, such as the QoS level, session priority, and the maximum allowed data rate. The UPF 306 processes this command by allocating the necessary network resources, such as bandwidth and processing power, to handle the session. The allocation is done in accordance with predefined network policies and the UPF's current load. The SMF 304 relies on the most recent load metric information available; if no recent metrics are accessible, it defaults to using established policies or historical data.

The session allocation command also dictates how the session should be integrated into the existing network infrastructure managed by the UPF 306. This integration involves updating routing tables, setting up forwarding rules, and configuring any necessary security parameters. Once these configurations are completed, the UPF 306 is ready to begin handling traffic for the session, allowing the UE 302 to start transmitting data.

At step 312, the SMF 304 sends a load metric request to the UPF 306. This request is part of the SMF 304's continuous monitoring protocol, which is designed to keep track of the UPF's 306 operational status and resource utilization in real-time. The load metric request is a structured query that prompts the UPF 306 to provide updated performance data, including CPU load, memory usage, and the number of active sessions. The SMF 304 periodically sends these requests or triggers them when it detects potential congestion or abnormal traffic patterns in the network. This proactive measure is essential for the SMF 304 to make informed decisions about resource allocation and session management.

By sending load metric requests, the SMF 304 ensures that it has the latest data on the UPF 306's capacity, allowing it to respond swiftly to any changes in network conditions. For instance, if the SMF 304 detects a sudden increase in traffic demand, it can use the load metrics to assess whether the UPF 306 can handle additional sessions or if traffic should be redirected to other UPFs. This real-time data-driven approach helps the SMF 304 prevent service degradation and maintain optimal network performance.

In response to the load metric request, step 314 involves the UPF 306 generating a load metric response. This response is a data packet containing detailed metrics that reflect the UPF 306's current operational state, including CPU usage, memory utilization, and the number of active sessions it is managing. The UPF 306 may also include additional metrics, such as packet loss rates, jitter, and latency statistics, which provide a more comprehensive view of its performance. The SMF 304 receives this load metric response and uses the information to adjust session allocations dynamically.

The SMF 304 analyzes the load metric response to determine if any changes to the current session distribution are necessary. If the UPF 306 is approaching its capacity limits, the SMF 304 may decide to offload some sessions to other UPFs or limit the allocation of new sessions to the affected UPF 306. This step is crucial for maintaining a balanced load across the network and preventing any single UPF 306 from becoming a bottleneck, which could compromise the quality of service.

Step 316 involves the UPF 306 sending periodic load metric updates to the SMF 304. These updates are transmitted at regular intervals, as defined by network policy, or when significant changes occur in the UPF 306's load. The periodic updates ensure that the SMF 304 always has the most current data on the UPF 306's performance, enabling it to make proactive decisions about session management. The UPF 306 automatically generates these updates based on its internal monitoring systems, which continuously track key performance indicators.

These periodic load metric updates allow the SMF 304 to continuously monitor the UPF 306's status without needing to send frequent requests. The SMF 304 uses the data from these updates to detect early signs of congestion or other issues, allowing it to intervene before they affect the overall network performance. This proactive management strategy helps maintain consistent service quality and ensures that the network can handle varying levels of demand.

If the SMF 304 does not receive a periodic load metric update within the expected timeframe, it initiates step 318 by sending a query for updated load metric information to the UPF 306. This query is a direct follow-up action to address potential communication failures or delays in the transmission of load metrics. The SMF 304 constructs the query based on predefined templates that specify the type of information required and the urgency of the request.

The SMF 304 transmits the query through a reliable communication channel, ensuring that it reaches the UPF 306 even under adverse network conditions. This step is vital for maintaining the accuracy of the data used by the SMF 304 in its decision-making processes. By actively querying the UPF 306, the SMF 304 ensures that it is not relying on outdated or incomplete information, which could lead to suboptimal session management and resource allocation.

In step 320, the UPF 306 responds to the SMF 304's query by sending the requested load metric information. This response is structured similarly to the periodic updates but is triggered specifically by the SMF 304's query. The updated load metric response provides the SMF 304 with the latest data on the UPF 306's performance, including any recent changes that may have occurred since the last update.

The SMF 304 analyzes the updated load metric response to reassess the UPF 306's capacity and adjust session allocations as needed. This step is crucial for ensuring that the network remains balanced and that no single UPF 306 becomes overwhelmed. The SMF 304 may also use this data to identify potential issues with the UPF 306, such as hardware failures or software malfunctions, which could impact its ability to handle sessions effectively.

In step 322, if the UPF 306 fails to respond to the SMF 304's query, the SMF 304 detects this as a communication failure. However, in scenarios where the UPF 306 fails to provide load metric information but continues to send control information and respond to other messaging protocols, the SMF 304 adopts a differentiated approach. In such cases, the SMF 304 recognizes that the UPF 306 is operational but potentially encountering issues related specifically to the transmission of load metrics. The SMF 304 uses the available control information to infer the UPF 306's operational state, such as its current capacity utilization and health status, while actively seeking to restore the flow of load metrics.

Upon detecting the absence of load metrics but continued reception of control information, the SMF 304 initiates a series of alternative actions to maintain network stability. These actions may include generating an alert to notify network operators of the issue, selectively reducing the allocation of new sessions to the affected UPF 306, and redistributing existing sessions to other UPFs with available capacity. The SMF 304 may implement these actions incrementally, depending on the severity of the situation and the inferred load on the UPF 306 based on the control information. For example, if the control information indicates that the UPF 306 is nearing capacity, the SMF 304 may preemptively offload sessions to prevent overload, even without the precise load metrics. Additionally, the SMF 304 may implement failover mechanisms to reroute traffic through backup UPFs if the primary UPF 306 remains unable to transmit load metrics over an extended period.

In step 324, the SMF 304 issues a session reallocation command in response to the lack of load metric information or a complete lack of response from the UPF 306. This command is a critical operational step that directs the transfer of active or idle sessions from the unresponsive or partially responsive UPF 306 to another UPF 306 within the network. The SMF 304 selects the target UPF 306 based on its current load metrics and control information, ensuring that it has sufficient capacity to handle the additional sessions without exceeding its operational limits.

The session reallocation command is executed through the network's control plane, updating routing tables, session records, and potentially reconfiguring load balancing algorithms to reflect the new distribution of sessions. In scenarios where load control information is available but load metrics are not, the SMF 304 may use this control information to make informed reallocation decisions, ensuring that the receiving UPFs are not overwhelmed including the UPF 306.

In step 326, the SMF 304 generates an alert for network operators if the UPF 306 fails to respond to multiple queries or consistently reports abnormal load metrics or if only control information is available without accompanying load metrics. This alert is an automated notification that includes detailed information about the issue, such as the UPF 306's last known state, the nature of the failure, and any steps already taken by the SMF 304 to mitigate the impact. The alert is sent to the network operations center (NOC), where operators can investigate the issue further and take corrective actions, such as performing maintenance on the UPF 306 or reconfiguring network parameters. The SMF 304 may also escalate the alert if the issue persists, prompting more aggressive measures such as triggering backup systems or initiating a UPF switchover.

In other embodiments, the SMF 304 issues a UPF switchover command. This command is executed when the UPF 306 continues to experience issues that cannot be resolved through session reallocation or other intermediate steps. The switchover command directs the network to transition all sessions and traffic handling responsibilities from the failing UPF 306 to a standby UPF that has been preconfigured for such scenarios.

The UPF switchover is a coordinated process that involves updating all relevant network elements, including routing tables, session records, and security configurations, to reflect the change in traffic flow. The SMF 304 supervises the switchover to ensure that it is carried out without interrupting active sessions. This step is the last resort to maintain network stability and ensure that user sessions remain uninterrupted, even in the face of severe issues with the primary UPF 306

Turning now to FIG. 4, a flow chart is provided that illustrates a method 400 for managing load distribution within a telecommunications network by employing a SMF that interacts with at least one UPF. The process begins at block 402, where the SMF initiates a request for load metric information from the UPF. This initial request is a critical step that allows the SMF to evaluate the current operational capacity and status of the UPF by analyzing key performance metrics, such as CPU usage, memory utilization, the number of active sessions being handled by the UPF, and load control information. This load control information may include details on current capacity thresholds, session prioritization rules, and dynamic load balancing settings. Collectively, this information is fundamental for the SMF to make informed decisions about session management and resource allocation.

At block 404, the SMF determines whether the requested load metric information has been received within a predefined time period. This determination is essential for ensuring that the SMF is working with the most up-to-date data, which is necessary for accurate session management. If the load metric information is received within the specified timeframe, the SMF continues with its standard session management operations. However, if the SMF does not receive the information within the predefined period, it moves to block 406, where it proactively queries the UPF for updated load metric information. This query serves to prompt the UPF to provide the latest data, ensuring that the SMF is not forced to rely on outdated or incomplete information, which could otherwise lead to suboptimal resource allocation and the risk of overloading the network.

In cases where the SMF continues to receive control information and other messaging from the UPF but lacks the necessary load metrics, the SMF may infer the UPF's operational state based on the available control data. This includes analyzing current session handling patterns, resource usage trends, and other operational parameters communicated through control messages. The SMF may adjust its session management strategies accordingly, even in the absence of precise load metrics, to maintain network stability.

In block 408, following the querying process, the SMF evaluates the received load metric information, if any, and may proceed to reallocate network sessions to maintain an optimal balance across available UPFs. This dynamic reallocation is performed to prevent any particular UPF from becoming a bottleneck due to excessive load, thereby ensuring efficient resource distribution within the network. If the SMF does not receive the necessary load metrics from the UPF, it takes preemptive action to redistribute sessions based on the last known data or default policies to mitigate the risk of network congestion. Additionally, if the SMF continues to receive control information but lacks load metrics, it may use this control data to make more informed reallocation decisions, ensuring that the network remains balanced and operational.

For instance, if control information indicates that the UPF is nearing its capacity based on historical patterns or inferred usage, the SMF might reduce new session allocations to the UPF and redirect traffic to other UPFs with known available capacity. This approach helps to mitigate the risk of overload and maintain optimal network performance, even when complete load metrics are unavailable.

Finally, at block 410, if the SMF still does not receive the required load metric information after querying, it proactively reallocates current sessions or redirects new sessions to other UPFs within the telecommunications network that have available capacity. This reallocation or redirection is based on the last known load metrics, historical performance data, and any control information still being received from the UPF. By taking these actions, the SMF ensures that the network continues to operate efficiently, minimizing the risk of overload and maintaining the quality of service. The SMF's ability to dynamically adjust session allocations without waiting for updated load metrics allows the network to remain stable and responsive, even in the face of incomplete data from a UPF.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A system for managing load distribution in a telecommunications network, the system comprising:
   one or more processors;
   one or more non-transitory computer readable media; and
   a session management function (SMF) embedded in the one or more one or more non-transitory computer readable media that, when executed by the one or more processors, cause the SMF to:
      receive load capacity information and control information from a plurality of user plane functions (UPFs);
      determine that the load capacity information and the control information has not been received from a first UPF of the plurality of UPFs within a predefined time period;
      query the first UPF for updated load capacity information in response to determining that the load capacity information has not been received and that the control information has been received within the predefined time period;
      determine that no updated load capacity information is received from the first UPF in response to the query; and
      reallocate one or more network sessions from the first UPF to a second UPF in response to the determination that no updated load capacity information is received.

2. The system of claim 1, wherein the load capacity information comprises one or more of a CPU usage, a memory utilization, a number of active sessions being managed by the UPF, throughput data, a packet loss rate, or a latency statistic.

3. The system of claim 1, wherein the load capacity information comprises at least one of a dynamic load balancing parameter, one or more session prioritization rules, or a capacity threshold for the first UPF.

4. The system of claim 1, wherein the control information comprises one or more of a session management command, one or more health status indicators of the UPF, one or more acknowledgments of received instructions from the SMF, and one or more status updates from the UPF.

5. The system of claim 1, wherein the control information further includes one or more indicators of UPF resource availability and an active session count.

6. The system of claim 1, wherein the operations further comprises reallocating network sessions based on a last known load capacity information, historical performance data of the UPF, or real-time control information received from the UPF.

7. The system of claim 6, wherein the reallocation of network sessions includes transferring sessions from the first UPF to one or more alternative UPFs within the plurality of UPFs that have sufficient available capacity as determined by their current load capacity information.

8. The system of claim 1, wherein the SMF is configured to generate a report following the reallocation of network sessions.

9. The system of claim 1, wherein the reallocation of network sessions is performed in real-time in response to the determination that updated load capacity information is not received.

10. A method for managing load distribution in a telecommunications network, the method comprising:

requesting, by a session management function (SMF), load metric information and control information from a first user plane function (UPF);

determining, by the SMF, that the load metric information has not been received and that the control information has been received from the first UPF within a first predefined time period;

querying, by the SMF, the first UPF for updated load metric information in response to determining that the load metric information has not been received within the first predefined time period; and reallocating network sessions managed by the SMF in response to determining that the updated load metric information has not been received within a second predefined time period.

11. The method of claim 10, wherein the load metric information comprises real-time performance data including CPU usage, memory utilization, and throughput metrics of the first UPF.

12. The method of claim 10, further comprising generating an alert if the updated load metric information is not received within a second predefined time period after the query is sent.

13. The method of claim 10, wherein reallocating network sessions comprises transferring active sessions on the first UPF to a second UPF that is determined to have sufficient capacity based on previously received load metric information.

14. The method of claim 10, wherein the SMF temporarily limits an initiation of new sessions on the first UPF until updated load metric information is received.

15. The method of claim 10, wherein the control information received from the first UPF includes session management commands, health status indicators, and acknowledgments of the SMF's instructions.

16. The method of claim 10, wherein the reallocation of network sessions is based on both the control information and any available load metric information from a second UPF.

17. The method of claim 10, wherein the SMF uses the control information to infer the operational status of the first UPF.

18. The method of claim 10, further comprising the SMF generating a report comprising a set of reallocation decisions made in response to an absence of updated load metric information for the first UPF.

19. A non-transitory computer readable media having instructions stored thereon that, when executed by one or more computer processing components, cause the one or more computer processing components to perform a method for managing load distribution in a telecommunications network, the method comprising:

receiving load capacity information and control information from a first user plane functions (UPFs);

determining that load capacity information has not been received from the first UPF within a predefined time period;

querying the first UPF for updated load capacity information in response to determining that the load capacity information has not been received within the predefined time period;

determining that updated load capacity information has not been received from the first UPF in response to the query while continuing to receive control information from the first UPF; and reallocating network sessions based on the determination that updated load capacity information has not been received.

20. The non-transitory computer readable media of claim 19, further comprising prioritizing a reallocation of network sessions based on a type of session, one or more Quality of Service (QoS) requirements, and an availability of resources across a plurality of UPFs.

* * * * *